United States Patent [19]

Radke et al.

[11] 4,027,757
[45] June 7, 1977

[54] COMPACT VIBRATION DAMPER

[75] Inventors: Edmund John Radke, Mount Clemens; Joseph Louis Bair, Royal Oak, both of Mich.

[73] Assignee: Borg-Warner Corporation, Chicago, Ill.

[22] Filed: Dec. 19, 1975

[21] Appl. No.: 642,508

[52] U.S. Cl. .......................... 192/106.2; 192/3.29; 64/27 C

[51] Int. Cl.² ......................................... F16D 3/66

[58] Field of Search ............... 192/3.29, 3.3, 106.1, 192/106.2; 64/27 C

[56] References Cited

UNITED STATES PATENTS

| | | | |
|---|---|---|---|
| 1,830,746 | 11/1931 | Ahlene et al. | 192/106.2 |
| 2,574,573 | 11/1951 | Libby | 192/106.2 |
| 2,764,004 | 9/1956 | Myers | 64/27 C |
| 2,920,733 | 1/1960 | Lysett | 192/107 |
| 2,984,091 | 5/1961 | Ludwig | 64/27 |
| 2,995,956 | 8/1961 | Moore | 192/3.3 |
| 3,001,415 | 9/1961 | Smirl | 74/846 |
| 3,095,716 | 7/1963 | Smirl | 64/27 |
| 3,107,551 | 10/1963 | Cline | 74/574 |
| 3,185,273 | 5/1965 | Smirl | 192/3.3 |
| 3,266,271 | 8/1966 | Stromberg | 192/106.2 |

FOREIGN PATENTS OR APPLICATIONS

| | | | |
|---|---|---|---|
| 1,392,788 | 4/1975 | United Kingdom | 192/106.2 |

Primary Examiner—Benjamin W. Wyche
Attorney, Agent, or Firm—James A. Geppert

[57] ABSTRACT

A vibration damper for use in a lock-up clutch for a hydraulic torque converter, wherein the clutch provides a direct drive between the engine and transmission of a vehicle in high gear. The vibration damper is designed to be located in a limited space and yet provide relatively large springs for a requisite high torque capacity. The damper is provided with a hub, a driven plate and spring retainer or drive plates; the plates having alternating mounting flanges or legs to be secured to a clutch plate in a common plane and reduce the total thickness of the assembly.

10 Claims, 11 Drawing Figures

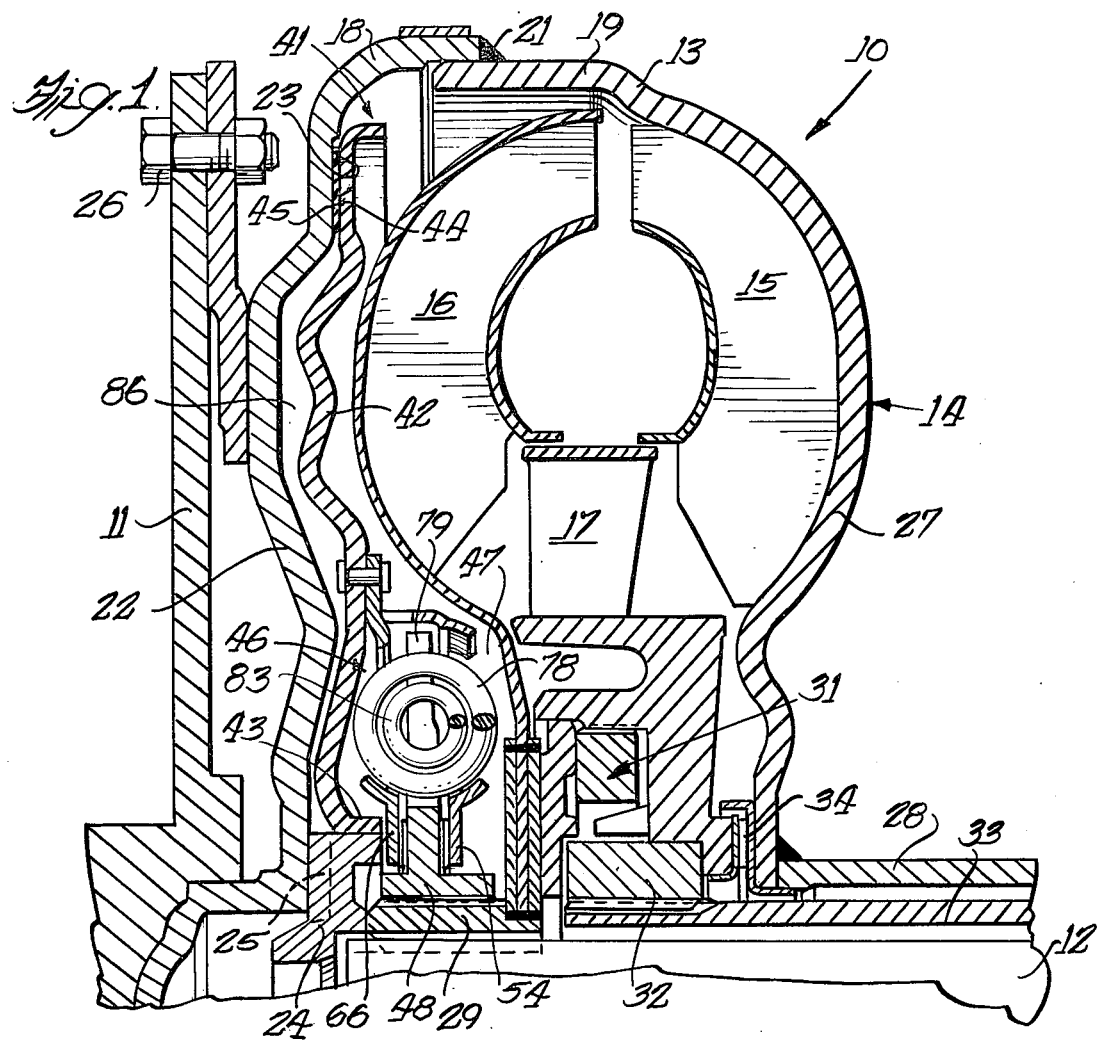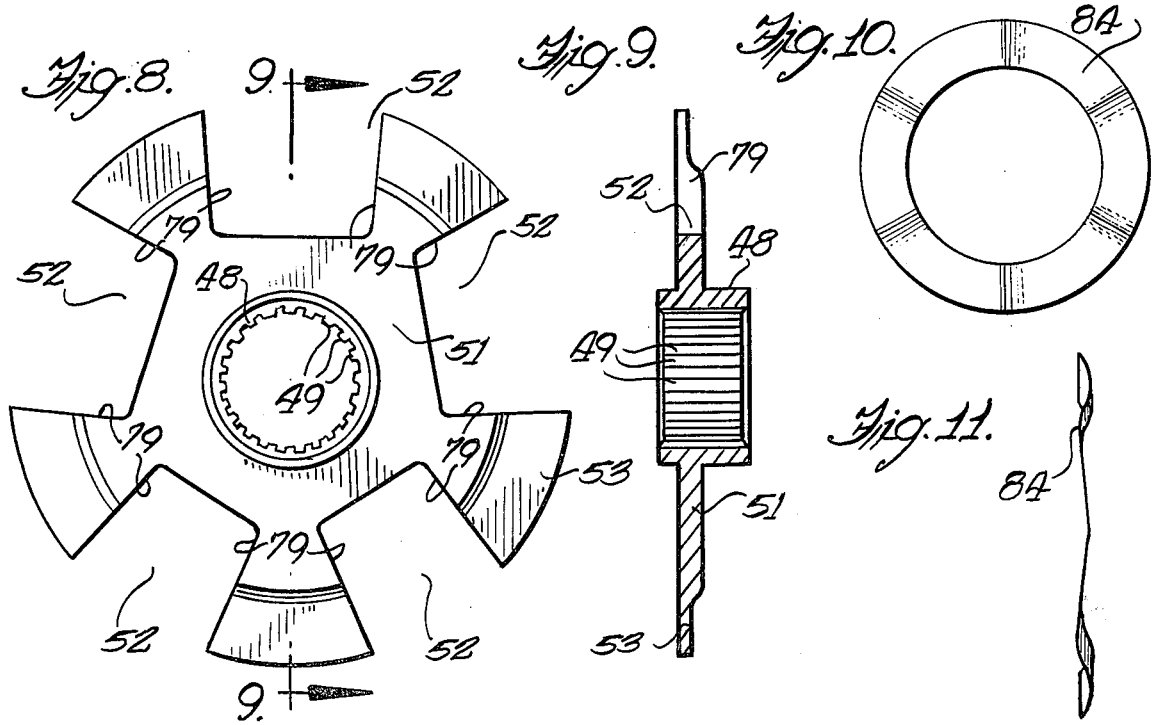

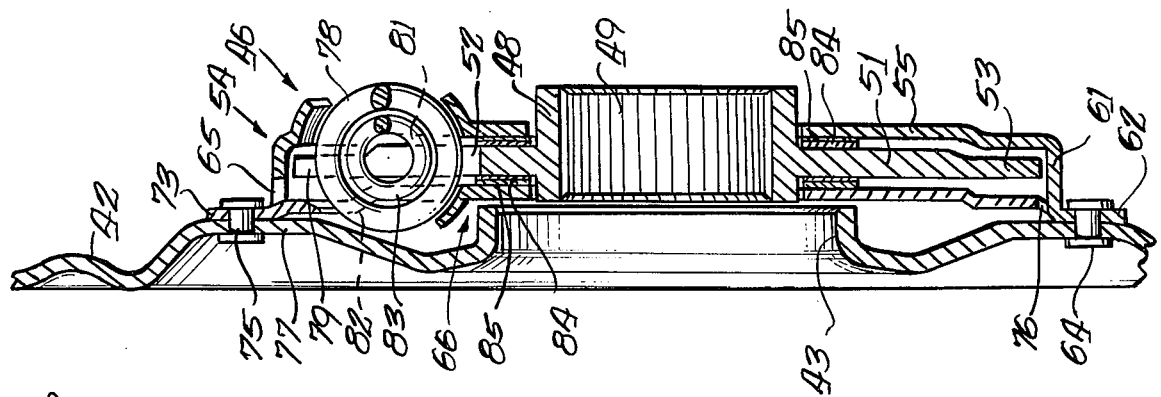

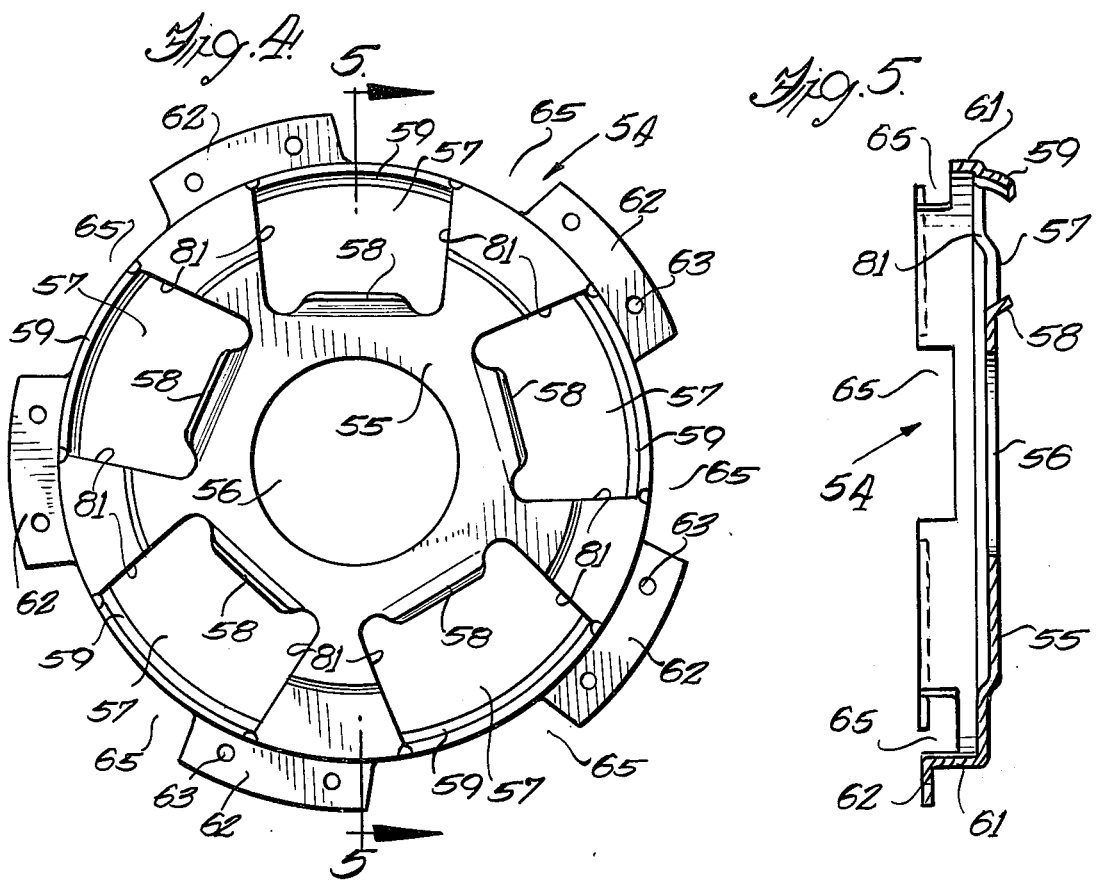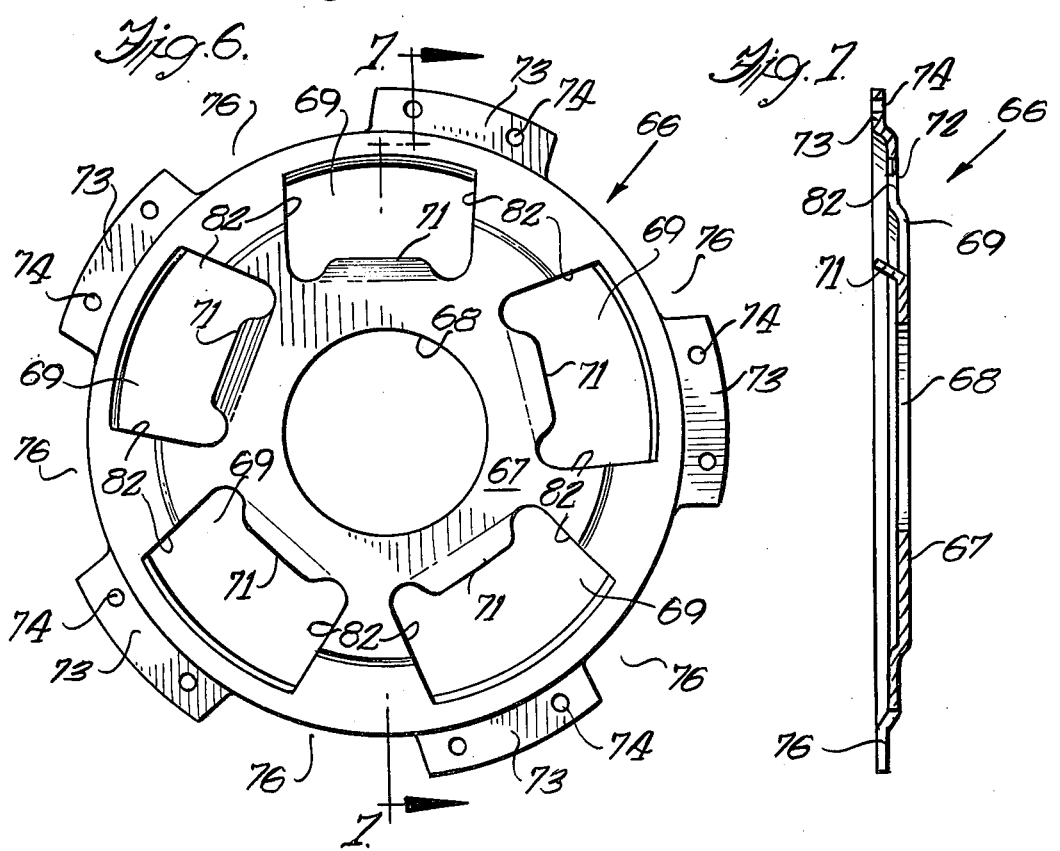

COMPACT VIBRATION DAMPER

BACKGROUND AND SUMMARY OF THE INVENTION

The present invention relates to a vibration damper for a clutch and more particularly to a damper for a lock-up clutch in a hydrodynamic device.

The use of a combination spring and friction type vibration damper in a conventional clutch ahead of a manually operated transmission for the purpose of neutralizing torsional vibrations emanating from the engine which would otherwise cause disturbing noises in the transmission and driveline is well known.

With an automatic transmission employing a constant slipping device such as a fluid coupling or a torque converter, the torsional vibrations are efficiently absorbed hydraulically and a vibration damper has been found unnecessary.

More recently, however, in order to obtain better fuel economy from motor vehicles employing automatic transmissions, a fluid coupling or a torque converter utilizes a lock-up clutch which at a programmed vehicle speed depending upon load and acceleration locks up the coupling or torque converter so that slippage no longer occurs. This usually takes place after the transmission is in high gear. Thus, when locked up, torsional vibrations from the engine can not be absorbed hydraulically and, therefore, manifest themselves in a disturbing manner such that a vibration damper in the lock-up clutch plate is necessary to eliminate the disturbance.

The present invention relates to an improved torsional vibration damper for a lock-up clutch utilized with a torque converter in an automotive vehicle. The vibration damper has a high torque capacity and angular displacement but will fit into a very limited space adjacent the torque converter shell. The lock-up clutch in the torque converter assembly provides a direct drive between the engine and transmission of the vehicle, thereby eliminating the slip of the torque converter and resulting loss of economy. Many of the prior vibration dampers used in a torque converter environment lacked the torque capacity to do the job and fit in the space available.

To provide the necessary torque capacity and angular displacement, larger springs were utilized on a slightly greater radius in the damper which required more of the limited space available. To utilize these larger springs, drive plates for the vibration damper were designed having peripheries with alternate legs and spaces so that all the legs of both plates are attached to the common plane of the piston member for the lock-up clutch. The legs of each drive plate provide radial mounting flanges which alternate on a single circle to be attached to the clutch piston member.

In view of the larger springs located on a greater than normal radius, the outermost window lip of the front drive plate was eliminated, and the limit stop means between the drive plates and the flange extending from the hub of the vibration damper is omitted for greater simplicity of assembly of the damper.

Further objects of the present invention are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a partial vertical cross sectional view through the torque converter and lock-up clutch assembly and showing the vibration damper of the present invention.

FIG. 2 is a front elevational view of the vibration damper taken from the right hand side of FIG. 3.

FIG. 3 is a vertical cross sectional view taken on the irregular line 3—3 of FIG. 2.

FIG. 4 is a front elevational view of the rear drive plate of the vibration damper.

FIG. 5 is a vertical cross sectional view taken on the line 5—5 of FIG. 4.

FIG. 6 is a front elevational view of the front drive plate of the vibration damper.

FIG. 7 is a vertical cross sectional view taken on the line 7—7 of FIG. 6.

FIG. 8 is a front elevational view of the hub of the vibration damper.

FIG. 9 is a vertical cross sectional view taken on the line 9—9 of FIG. 8.

FIG. 10 is a front elevational view of a spring spacer washer.

FIG. 11 is an edge elevational view of the spacer washer.

DESCRIPTION OF THE PREFERRED EMBODIMENT

Referring more particularly to the disclosure in the drawings wherein is shown an illustrative embodiment of the present invention, FIG. 1 discloses a hydrodynamic device specifically of the type commonly termed a hydraulic torque converter. Hydraulic torque converter assembly 10 is associated with a lock-up clutch device 41 for alternatively transmitting power through the converter or directly through the clutch and thereby by-passing the converter. The torque converter assembly 10 broadly comprises an input and output means shown respectively as a flywheel 11 and a shaft 12; a rotatable housing 13 being integrally connected to the input means and adapted to enclose both the converter elements and the clutch assembly. The torque converter 14 is of conventional design and comprises an impeller 15 drivingly connected to the housing 13, a turbine 16 and a stator 17.

More specifically, the driving housing 13 includes a forward generally cylindrical portion 18 and a rearward cylindrical portion 19 joined together by welding 21; the forward portion having a radially inwardly extending flange 22 with an interior annular clutching surface 23 thereon. An annular ring 24 having circumferentially spaced openings 25 therein abuts the flange 22 which is secured by bolt and nut fasteners 26 to the flywheel 11. The portion 19 has a rounded and inwardly extending member 27 secured as by welding to an impeller hub 28.

The turbine 16 is attached by welding to an annular hub 29 splined to the output shaft 12 which is concentrically disposed within the impeller hub 28 and is connected to suitable gearing of a transmission (not shown). The stator 17 is suitably connected, such as by a one-way clutch 31, to an inner race 32 that is splined onto a stator reactor sleeve 33 concentrically arranged between the impeller hub 28 and the output shaft 12. Suitable bearings (not shown) are disposed between the various concentrically disposed shafts for maintaining proper alignment and independent rotation of each, and annular thrust bearing means 34 is provided between the stator hub and the inner radial surface of impeller 15 and has openings extending radially therethrough to provide passageways for the flow of oil to be later described.

The lock-up clutch device 41 utilizes a generally annular clutch piston 42 of a radially undulating contour slidably mounted by an inner axially extending flange 43 on the annular ring 24; the radial passages 25 is the ring 24 acting as oil passageways to provide fluid pressure on the left-hand side of the piston. Adjacent the outer edge, the piston is provided with a flat annular friction surface 44 which has a suitable friction material 45 affixed thereto.

The clutch piston 42 is operatively connected to the annular hub 29 through a vibration damper 46 positioned in the space 47 formed between the inner portion of the clutch piston and the inner portion of the turbine 16. As more clearly seen in FIGS. 2 and 3, the vibration damper 46 includes a hub 48 having internal splines 49 to cooperate with external splines on the hub 29 and an integral outwardly radially extending flange 51. The flange 51 as seen in FIGS. 8 and 9, is provided with a plurality of outwardly opening circumferentially spaced spring recesses or notches 52; the outer edge 53 of the flange being of a lesser thickness than the portion adjacent the hub.

Enclosing the hub 48 and flange 51 are a pair of generally parallel drive plates identified as the rear drive plate 54 and the front drive plate 66. The rear drive plate 54 (see FIGS. 4 and 5) consists of a generally flat portion 55 having a central opening 56 to receive the hub 48 and a plurality of spaced spring windows or openings 57 adapted to be generally axially aligned with the recesses 52 in the flange 51. Each opening has an inner lip 58 and an outer lip 59 to retain damping springs in the recesses 52 and windows 57. The flat portion 55 terminates in an axially extending annular rim 61 projecting toward the clutch piston over the outer edge 53 of the hub flange 51. Circumferentially spaced on the edge of the rim 61 are a plurality of circumferentially equally spaced radially extending mounting flanges or legs 62 having openings 63 for suitable mounting means such as rivets 64; the legs being separated by spaces 65.

The front drive plate 66 (see FIGS. 6 and 7) also includes a generally flat portion 67 having a central opening 68 to receive the hub 48 and a plurality of spaced spring windows or openings 69 to be generally aligned with the recesses 52 and the windows 57. Each window 69 has an inner lip 71 and an outer chamfered edge 72 to aid in retaining the damping springs. Slightly offset from the plane of the flat portion 67 are a plurality of circumferentially spaced radially extending mounting flanges or legs 73 having openings 74 for suitable mounting means such as rivets 75; the legs 73 defining spaces 76 therebetween.

As seen in FIG. 2, the rear drive plate 54 and the front drive plate 66 are positioned on the hub 48 on opposite sides thereof; with the front drive plate lying closely adjacent to the clutch piston 42 and having mounting legs 73 engaging and riveted to an annular raised surface 77 formed on the piston. The rear drive plate 54 has its mounting legs 62 positioned in the spaces 76 between the legs 73 of plate 66 and riveted to the surface 77; the spaces 65 between the legs 62 receiving the legs 73 of plate 66.

Positioned within each set of aligned windows 57, 69 and notch 52 is a damping spring 78 with the ends of the spring engaging the edges 79 of the notch 52 and the edges 81, 82 of the windows 57, 69, respectively. A smaller spring 83 may be positioned within each larger spring 78 to enhance the damping effect. Because the springs are larger and on a greater radius than normal, the conventional limit stop on the flange 51 was eliminated for greater simplicity and the chamfered edge 72 substituted for an outer retaining lip on the front drive plate. Positioned between the flange 51 and each plate 54 and 66 adjacent the hub 51 is a spring spacer ring or washer 84 having a wave configuration, as seen in FIG. 11, and one or more planar rings or washers 85 to exert axial thrust between the hub and plates for the purpose of providing the required damping friction.

The clutch piston 42 and vibration damper 46 can be easily assembled with the mounting legs 62 and 73 of the rear drive plate 54 and front drive plate 66, respectively, being mounted in a common plane on the piston 42 to minimize the space necessary for the damper; the mounting legs of the two plates alternating in a circle on the surface 77. The vibration damper acts to provide a neutralizing action upon torsional vibrations transmitted between the clutch piston 42 and the hub 48 when the clutch is engaged through the combination of the resiliently biased force resisting relative rotation between the hub 48 and the plates 54 and 66 connected to the clutch piston 42 and the damping friction.

With respect to actuation of the clutch piston, fluid pressure is always present in the chamber of the torque converter 14 and, when the transmission is in neutral or an accelerating condition, a higher pressure is supplied through a separate circuit, such as through a passage (not shown) in the output shaft 12, to enter the chamber 86 between the flange 22 of the housing 13 and the clutch piston 42. This pressure urges the piston to the right, as viewed in FIG. 1, to hold the piston released while driving in the lower gears through the torque converter. Upon the transmission shifting into high gear, the pressure to the clutch piston chamber 86 through the openings 25 is dropped to a level below that in the torque converter, possibly to zero, so that the full pressure in the torque converter is effective to urge the clutch piston 42 forward (to the left as viewed in FIG. 1) thus engaging the friction surface 44 and friction material 45 on the piston with the clutching surface 23 on the flange 22 rotating with the flywheel 11 and providing a one-to-one lock-up. Therefore, a direct drive results in high gear between the flywheel 11 and the output shaft 12 through the housing 13, clutch piston 42, vibration damper 46 and annular hub 29.

Although this vibration damper 46 is designed to fit in the limited space 47 within a torque converter, such a damper assembly is capable of use in the driven member of a conventional clutch, and it is not our desire or intent to unnecessarily limit the scope or utility of the improved features by virtue of this illustrative embodiment.

We claim:
1. A vibration damper for a clutch for a hydrodynamic device, comprising a hub having a flange, a plate assembly including a pair of plates disposed on opposite sides of said flange and spaced therefrom, said flange and plates each having means defining a plurality of openings, resilient means disposed in each of said openings, and circumferentially spaced mounting legs on each said plate adapted to be secured to and located in a common plane of a driving member.

2. A vibration damper as set forth in claim 1, in which said mounting legs of said plates are arranged in alternating fashion in said common plane.

3. A vibration damper as set forth in claim 1, wherein the first of said plates is positioned adjacent the driving member and is relatively flat, and the second of said plates on the opposite side of said hub flange terminates at its outer periphery in an axially extending annular rim with flange portions forming said mounting legs extending radially therefrom.

4. A vibration damper as set forth in claim 3, wherein the mounting legs of the first plate are in substantially the same plane as the plate, and the mounting legs of the second plate are formed on the free edge of the annular rim.

5. A vibration damper as set forth in claim 3, in which said annular rim encompasses the outer edge of the hub flange and said resilient means.

6. A vibration damper as set forth in claim 3, wherein said openings in the second plate are each provided with inner and outer lips thereon, and said openings in the first plate are each provided with an inner lip and an outer chamfered edge.

7. A vibration damper as set forth in claim 6, in which the openings in the hub flange are outwardly opening spring recesses, said lips on the second plate and said lip and chamfered edge on the first plate adapted to prevent lateral movement of said resilient means relative to said sets of openings.

8. A vibration damper as set forth in claim 1, in which said resilient means comprises at least one compression spring positioned in each set of openings.

9. A vibration damper as set forth in claim 1, wherein said hub flange has a plurality of circumferentially spaced outwardly opening spring recesses, said pair of plates including a first substantially flat plate having a plurality of circumferentially spaced openings, each opening having an inner lip and an outer chamfered edge, said mounting legs for the first plate being slightly offset from the central portion of the plate, a second substantially flat plate on the opposite side of said hub flange having a plurality of circumferentially spaced openings and terminating at its outer periphery in an axially extending annular rim encompassing the hub flange and said resilient means, said mounting legs for the second plate comprising flange portions extending radially from said annular rim, said openings in the second plate having inner and outer lips, said recesses in the hub flange and said openings in said plates being axially aligned to receive said resilient means with said lips and chamfered edge of said plates limiting lateral motion thereof, said resilient means comprising at least one compression spring received in each recess and aligned plate openings, and said mounting legs of said plates being arranged in alternating fashion in the common plane of and secured to said driving member.

10. A vibration damper as set forth in claim 1, including friction means in the form of spacer washers and resilient spring washers between said hub flange and said plates.

* * * * *